April 20, 1926.

F. R. OWENS

WINDMILL 1,581,862

Original Filed Feb. 7, 1925   3 Sheets-Sheet 1

F. R. Owens
INVENTOR

BY Victor J. Evans
ATTORNEY

WITNESS:

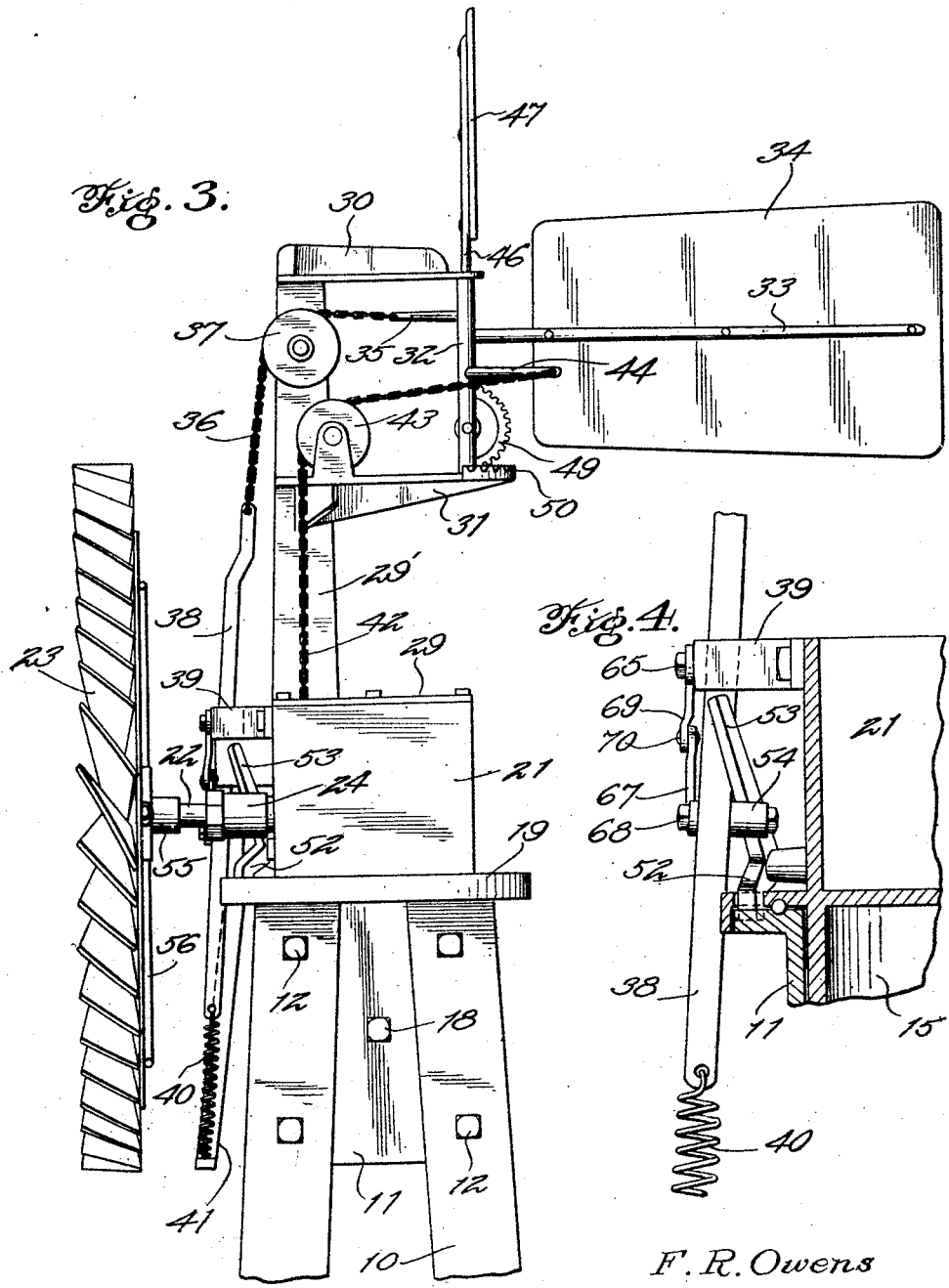

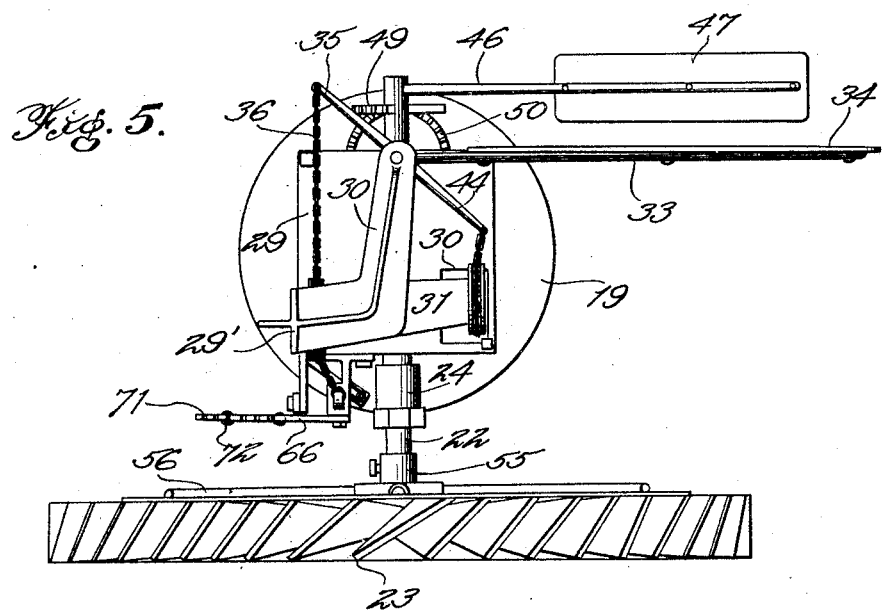
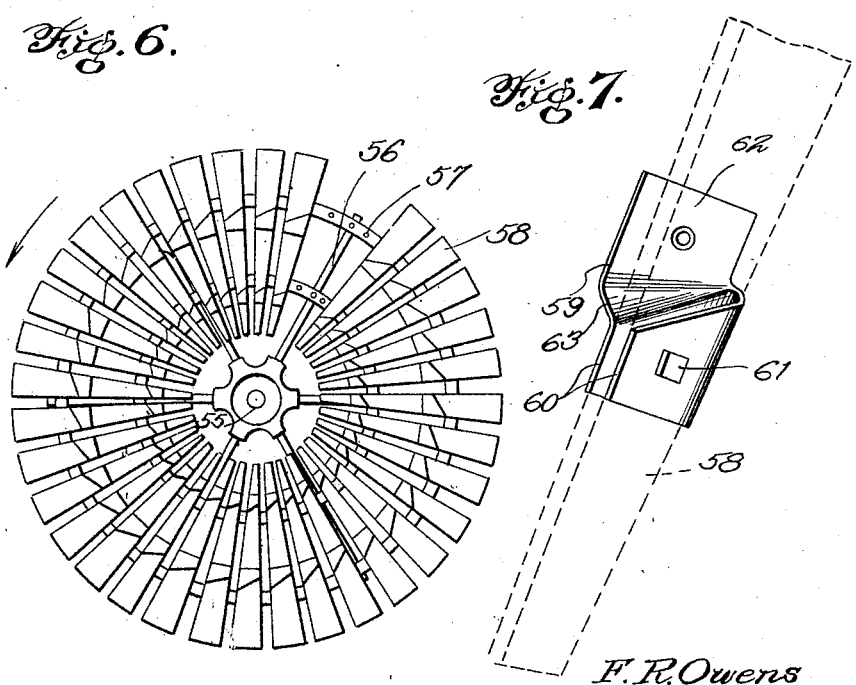

Patented Apr. 20, 1926.

1,581,862

UNITED STATES PATENT OFFICE.

FRANK R. OWENS, OF BEAVER CROSSING, NEBRASKA.

WINDMILL.

Application filed February 7, 1925, Serial No. 7,651. Renewed March 2, 1926.

*To all whom it may concern:*

Be it known that I, FRANK R. OWENS, a citizen of the United States, residing at Beaver Crossing, in the county of Seward and State of Nebraska, have invented new and useful Improvements in Windmills, of which the following is a specification.

This invention relates to wind mills or wind motors and has for an object the provision of means for controlling the operation of the mill by automatically moving the wind wheel off the wind when the latter reaches a given velocity and for automatically returning the wheel to operative position as the velocity of the wind decreases.

Another object of the invention is the provision of means for locking the head of the mill against rotation in one direction when the mill is in operation, the purpose being to prevent tendency of the wind wheel to move out of the wind due to the direction of rotation of said wheel, the locking means permitting free rotation of the head in an opposite direction.

Another object of the invention is the provision of means for automatically releasing the locking means above mentioned in the event of a change in direction of the wind and thus permit the head to revolve freely until the wheel is in proper operative position and to thereafter automatically lock the head against rotation in one direction.

Another object of the invention is the provision of a wind wheel of novel construction wherein the blades of the wheel are secured to the wheel frame in a manner to prevent the blades from splitting so that the latter may be made of relatively thin light wood.

With the above and other objects in view, the invention further includes the following novel features and details of construction, to be hereinafter more fully described, illustrated in the accompanying drawings and pointed out in the appended claims.

In the drawings:

Figure 3 is an elevation of the mill.

Figure 4 is a fragmentary vertical sectional view.

Figure 5 is a top plan view of the mill.

Figure 6 is an elevation of the wind wheel with some of the blades removed.

Figure 7 is a detail perspective view of one of the blade clamps with a portion of the blade shown by dotted lines.

Figure 1:
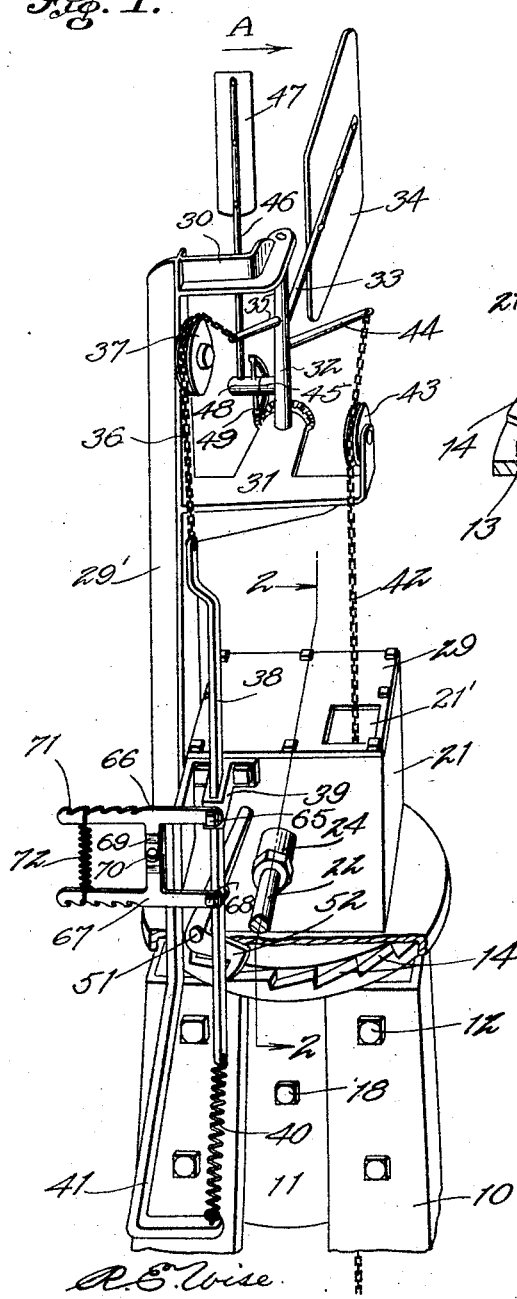
Figure 1 is a perspective view showing a wind mill constructed in accordance with the invention.
Figure 2:
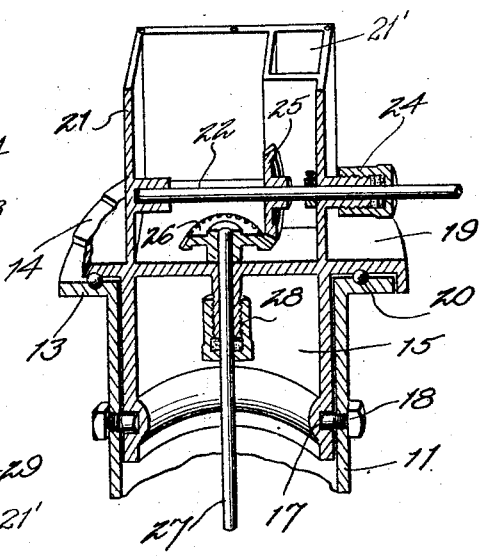
Figure 2 is an enlarged sectional perspective view taken substantially on the line 2—2 of Figure 1.

Referring to the drawings in detail wherein like characters of reference denote corresponding parts, the reference character 10 indicates a portion of the tower of the mill, the upper end of which includes a cylinder 11. The standards or angle irons which form a part of the tower 10 are bolted to the cylinder 11 as indicated at 12. The cylinder 11 is provided at its upper end with a horizontally disposed flange 13 and the upper edge of this flange is provided with spaced teeth 14, the purpose of which will be later explained.

Rotatably mounted upon the tower 10 is a head which includes a lower cylindrical portion or sleeve 15. This sleeve extends downwardly within the cylinder 11 and is provided with an annular groove 17 for the reception of the inner ends of studs 18, the latter being carried by and extending through the cylinder 11 so that the sleeve is swiveled within the cylinder. The sleeve is provided with an annular flange 19 which extends over the flange 13 and located between these flanges are balls or anti-friction devices 20. The flanges 13 and 19 thus provide bearing flanges for rotatably supporting the head.

Extending upwardly from the sleeve 15 is a gear housing 21 and rotatably mounted within this housing is a horizontally disposed wheel shaft 22 upon the outer end of which is mounted a wind wheel 23. This shaft extends through a stuffing box 24 and has secured thereon within the housing 21 a beveled pinion 25. This pinion engages and drives a beveled pinion 26 which is mounted upon the upper end of a vertically disposed shaft 27, the latter extending downwardly and being adapted for operative association with a pump jack or the like. The shaft 27 extends through a stuffing box 28. The housing 21 is closed by a removable lid or cover 29 while a passage 30 extends through the housing.

Extending upwardly from the housing 21 is a vertically disposed arm 29' from which extends spaced horizontally disposed brackets 30 and 31. Pivotally mounted within these brackets is a vertically disposed post 32 and extending from this post is a horizontal arm 33 to which is secured a vane 34.

Also extending from the post 32 is an arm 35 and secured to this arm is one end of a chain or cable 36 which passes over a grooved pulley 37, the latter being mounted for rotation upon the arm 29. The opposite end of the chain or cable 36 is connected to a bar or rod 38 which operates through a guide bracket 39 extending from the gear housing 21. The lower end of the bar or rod 38 is connected through the medium of a spring 40 with a bracket arm 41 which is rigid with the gear housing 21. This arrangement holds the vane 34 normally rigid with respect to the rotatable head and yieldingly maintains the vane at a right angle with respect to the wheel 23. The vane however is capable of being moved horizontally so as to throw the wheel off the wind. This may be accomplished manually by pulling upon a chain or cable 42 which extends downwardly through the passage 21' of the gear housing and which passes over a grooved pulley 43 carried by the bracket 31 and is secured to an arm 44 which extends from the post 32.

Extending from the post 32 is a horizontally disposed stud 45 and pivotally mounted upon this stud is the inner end of an arm 46. This arm is normally vertically disposed and carries at its outer end a governor vane 47. For the purpose of pivoting the arm 46 upon the stud 45, the inner end of the said arm carries a sleeve 48 and secured to this sleeve is a segmental gear 49 which engages a segmental gear 50 rigid with the bracket 31. As the vane 47 is normally vertically disposed and arranged in the path of travel of the wind, wind of a given velocity will cause the vane 47 to move downward. This downward movement will through the engagement of the gears 49 and 50, rotate the post 32 to move the vane 34 and thus move the wind wheel off the wind. The degree of this movement is proportionate to the increase in velocity of the wind. As soon as the velocity of the wind decreases, the spring 40 will cause the vanes 34 and 47 to return to their normal positions.

The blades of the wheel 23 are so arranged as to cause the wheel to rotate in an anticlockwise direction and to prevent any tendency of the head of the mill to rotate horizontally clockwise due to the force of rotation of the wheel 23, there is pivotally mounted upon the gear housing 21 as shown at 51, a dog 52 which engages the teeth 14. This dog will hold the head against rotation horizontally clockwise but will permit free rotation in an opposite direction. The dog is provided with an arm 53 which is adapted to be engaged by a roller 54 which is carried by the rod or bar 38. Should the wind strike the vane 34 from the direction of the arrow indicated at A in Figure 1 of the drawings, movement of the vane 34 in the direction of the wind will move the bar or rod 38 upward and cause the roller 54 to engage the arm 53 to lift the dog from engagement with the teeth 14 and permit the head to revolve. As soon as the wheel is positioned, pressure upon the vane 34 will be released and the dog 52 will re-engage the teeth 14 to hold the wheel in position as before described. This engagement of the dog 52 from the teeth 14 is also effected by downward movement of the vane 47, this downward movement rotating the post 32 and lifting the rod or bar 38.

The wheel 23 comprises a hub 55 from which extend spokes 56, while secured to these spokes are spaced rings or annuli 57. The blades 58 of the wheel are secured to these rings 57 by clamps 59. These clamps are formed of sheet metal bent to provide spaced plates 60 which receive between them the blades 58, while bolts or screws 61 serve to hold the blades in position. Extending from one of the plates 60 is an offset air tight plate 62 which is riveted or otherwise secured to the rings 57. The plate 62 and the plate 60 from which it extends are connected by a substantially triangular or wedge-shaped portion 63 so that when the plate 62 is secured to its ring 57 the clamping plate 60 will be disposed at an angle with respect to the face of the wheel so that the blades will be arranged substantially as illustrated in Figures 3 and 5 of the drawings.

Pivotally secured upon the bracket 39 as indicated at 65 is an arm 66 while a similar arm 67 is pivotally secured to the rod 38 as shown at 68. The arms 66 and 67 are provided with inwardly extending projections 69 which are connected by a pivot 70. The arms 66 and 67 are further provided with spaced notches 71. These notches provide seats for the opposite ends of a spring 72 which acts to force the opposite ends of the arms apart and thus resist upward movement of the rod 38. The resistance may be increased or reduced by adjusting the spring 72 in the notches 71. The tension at which the vane 34 will operate may thus be regulated.

The invention is susceptible of various changes in its form, proportions and minor details of construction and the right is herein reserved to make such changes as properly fall within the scope of the appended claims.

Having described the invention what is claimed is:—

1. In a wind mill, a support, a horizontally rotatable head including a wind wheel, a horizontally disposed vane extending from the head for holding the wheel in the wind, a vertically disposed vane, means operatively associating the vanes whereby the vertically disposed vane may be actuated to move the horizontal vane, ratchet mechanism connecting the support and head for holding the head against movement in one direction, means controlled by the vanes for releasing the head holding means and means for automatically returning the vanes to normal position.

2. In a wind mill, a horizontally rotatable head including a wind wheel, a horizontally disposed vane extending from the head for holding the wheel in the wind, a vertically disposed vane, means operatively associating the vanes whereby the vertically disposed vane may be actuated to move the horizontal vane, ratchet means for holding the head against movement in one direction, means controlled by either of the vanes for releasing the head holding means and means for automatically returning the vanes to normal position.

3. In a wind mill, a horizontally rotatable head including a wind wheel, a vertically disposed arm included in the head, spaced horizontally disposed brackets extending from the arm, a vertically disposed post having its opposite ends mounted in the spaced brackets, right angularly disposed vanes supported by the post, means whereby one of the vanes will act to hold the wheel in operative position, means whereby the other vane may be actuated to control the position of the first mentioned vane and means for returning the vanes to normal position.

4. In a wind mill, a horizontally rotatable head including a wind wheel, a vertically disposed arm included in the head, spaced horizontally disposed brackets extending from the arm, a vertically disposed post having its opposite ends mounted in the spaced brackets, right angularly disposed vanes supported by the post, means whereby one of the vanes will act to hold the wheel in operative position, means carried by the other vane and operatively associated with one of the brackets to control the position of the first mentioned vane and means for returning the vanes to normal position.

5. In a windmill, a horizontally rotatable head including a wind wheel, a vertically disposed arm included in the head, spaced horizontally disposed brackets extending from the arm, a vertically disposed post having its opposite ends mounted for rotation in the spaced brackets, a horizontally movable vane extending from the post and adapted to hold the wheel in operative position, a normally vertically disposed vane, means including the post for connecting the vanes whereby the latter may be simultaneously or independently moved to control the position of the wheel and means for returning the vanes to normal position.

6. In a windmill, a horizontally rotatable head including a wind wheel, a ratchet mechanism for holding the wheel against rotation in one direction, a direction vane, a governor vane and means operatively associating the vanes and ratchet mechanism whereby movement of either of the vanes will disengage said ratchet mechanism and release the head.

7. In a windmill, a horizontally rotatable head including a wind wheel, a horizontally disposed vane extending from the head for holding the wheel in the wind, a vertically disposed vane, means operatively associating the vanes whereby the vertically disposed vane may be actuated to move the horizontal vane, means for automatically returning the vanes to normal position and means including spaced pivotally mounted yieldingly held arms for adjusting the automatic returning means of the horizontal vane.

8. In a windmill, a horizontally rotatable head including a wind wheel, a horizontally disposed vane extending from the head for holding the wheel in the wind, a vertically disposed vane, means operatively associating the vanes whereby the vertically disposed vane may be actuated to move the horizontal vane, means for automatically returning the vanes to normal position and yieldingly adjustable means for regulating the automatic returning means of the horizontal vane.

9. In a windmill, a horizontally rotatable head including a wind wheel, a horizontally disposed vane extending from the head for holding the wheel in the wind, a vertically disposed vane, means operatively associating the vanes whereby the vertically disposed vane may be actuated to move the horizontal vane, means including a spring resisted vertically movable rod for automatically returning the vanes to normal position and adjustable means associated with the rod for regulating the vane returning means.

10. In a windmill, a horizontally rotatable head including a wind wheel, a horizontally disposed vane extending from the head for holding the wheel in the wind, a vertically disposed vane, means operatively associating the vanes whereby the vertically disposed vane may be actuated to move the horizontal vane, means including a spring resisted vertically movable rod for automatically returning the vanes to normal position, pivotally connected arms associated with the rod and spring means adjustably engaging the arms for regulating the vane returning means.

In testimony whereof I affix my signature.

FRANK R. OWENS.